United States Patent
Barnwal et al.

(10) Patent No.: US 11,887,296 B2
(45) Date of Patent: Jan. 30, 2024

(54) SETTING UP CARE AREAS FOR INSPECTION OF A SPECIMEN

(71) Applicant: KLA Corporation, Milpitas, CA (US)

(72) Inventors: Raja Barnwal, Burdwan (IN); Saptarshi Majumder, Kolkata (IN)

(73) Assignee: KLA Corp., Milpitas, CA (US)

( * ) Notice: Subject to any disclaimer, the term of this patent is extended or adjusted under 35 U.S.C. 154(b) by 147 days.

(21) Appl. No.: 17/519,011

(22) Filed: Nov. 4, 2021

(65) Prior Publication Data

US 2023/0005117 A1   Jan. 5, 2023

(51) Int. Cl.
| | |
|---|---|
| *G06T 7/00* | (2017.01) |
| *G06V 10/20* | (2022.01) |
| *G06V 20/80* | (2022.01) |

(52) U.S. Cl.
CPC ............ *G06T 7/001* (2013.01); *G06T 7/0006* (2013.01); *G06V 10/255* (2022.01); *G06V 20/80* (2022.01); *G06T 2207/30148* (2013.01); *G06T 2207/30168* (2013.01); *G06T 2207/30242* (2013.01); *G06V 2201/06* (2022.01)

(58) Field of Classification Search
CPC ....... G06T 7/001; G06T 7/0006; G06V 20/80; G06V 10/255; G06V 2201/06
See application file for complete search history.

(56) References Cited

U.S. PATENT DOCUMENTS

| | | | |
|---|---|---|---|
| 6,466,895 B1 | 10/2002 | Harvey et al. | |
| 7,570,796 B2 | 8/2009 | Zafar et al. | |
| 7,676,077 B2 | 3/2010 | Kulkarni et al. | |
| 8,126,255 B2 | 2/2012 | Bhaskar et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 2006/0182333 A1 | 8/2006 | Akimoto | |

(Continued)

FOREIGN PATENT DOCUMENTS

| | | |
|---|---|---|
| JP | 2011-128030 | 6/2011 |
| KR | 10-2009-0092895 | 9/2009 |
| WO | 2020-224612 | 11/2020 |

OTHER PUBLICATIONS

International Search Report for PCT/US2022/036064 dated Oct. 17, 2022.

*Primary Examiner* — David Perlman
(74) *Attorney, Agent, or Firm* — Ann Marie Mewherter (57) ABSTRACT

Methods and systems for setting up care areas (CAs) for inspection of a specimen are provided. One system includes an imaging subsystem configured for generating images of a specimen and a computer subsystem configured for determining a number of defects detected in predefined cells within one or more of the images generated in a repeating patterned area formed on the specimen. The computer subsystem is also configured for comparing the number of the defects detected in each of two or more of the predefined cells to a predetermined threshold and designating any one or more of the two or more of the predefined cells in which the number of the defects is greater than the predetermined threshold as one or more CAs. In addition, the computer subsystem is configured for storing information for the one or more CAs for use in inspection of the specimen.

19 Claims, 5 Drawing Sheets

(56) References Cited

U.S. PATENT DOCUMENTS

| | | | |
|---|---|---|---|
| 2006/0280358 A1* | 12/2006 | Ishikawa | G01N 21/95607 |
| | | | 382/149 |
| 2009/0219520 A1 | 9/2009 | Ko et al. | |
| 2009/0220142 A1* | 9/2009 | Matsushita | G06T 7/0004 |
| | | | 382/149 |
| 2012/0029858 A1* | 2/2012 | Kulkarni | G05B 19/41875 |
| | | | 702/108 |
| 2016/0123898 A1* | 5/2016 | Chen | G01N 21/8851 |
| | | | 356/237.5 |
| 2017/0286589 A1* | 10/2017 | Huang | G03F 7/7065 |
| 2018/0276808 A1* | 9/2018 | Brauer | G01N 21/9501 |
| 2020/0126212 A1* | 4/2020 | Duffy | H01L 22/12 |
| 2022/0223481 A1 | 7/2022 | Zheng et al. | |

* cited by examiner

SETTING UP CARE AREAS FOR INSPECTION OF A SPECIMEN

BACKGROUND OF THE INVENTION

1. Field of the Invention

The present invention generally relates to methods and systems for setting up care areas for inspection of a specimen.

2. Description of the Related Art

The following description and examples are not admitted to be prior art by virtue of their inclusion in this section.

Inspection processes are used at various steps during a semiconductor manufacturing process to detect defects on reticles and wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

"Care areas" as they are commonly referred to in the art are areas on a specimen that are of interest for inspection purposes. Sometimes, care areas (CAs) are used to differentiate between areas on the specimen that are inspected from areas on the specimen that are not inspected in an inspection process. In addition, CAs are sometimes used to differentiate between areas on the specimen that are to be inspected with one or more different parameters. For example, if a first area of a specimen is more critical than a second area on the specimen, the first area may be inspected with a higher sensitivity than the second area so that defects are detected in the first area with a higher sensitivity. Other parameters of an inspection process can be altered from CA to CA in a similar manner.

Different categories of inspection CAs are currently used. One category is legacy CAs, which are traditionally hand drawn. With nearly all users adopting design guided inspection, very few legacy CAs are currently used. Another category is design based CAs. These are CAs derived based on heuristics on chip design patterns printed on the specimen. The user tries to look at the chip design and derive methods/scripts that will help derive CAs. There are multiple techniques and tools available to define these design based CAs. As they are derived from ground truth (chip design), they can provide high precision, substantially tiny CAs and also allow inspection systems to store high volumes of CAs. These CAs are important not just from a defect detection standpoint, but they are often crucial to noise suppression.

Some currently used inspection methods also use regular groups of CAs in which CAs of different noise behavior are grouped together and even one single CA can include many different structures of different noise behavior. In order to identify areas in which the noise is higher, several iterations of a so-called design-based search has to be performed over and over. This procedure takes a lot of time.

The currently used methods and systems for setting up inspection CAs have, therefore, a number of disadvantages. For example, many methods and systems for setting up inspection CAs are computationally expensive methods that require access to the intellectual property such as GDS files of the entity that designed the device, at least a portion of which is being inspected. In addition, systematic noise sources can be suppressed by manually drawing CAs at the target locations. However, this method is tedious and time consuming as there could be more than one thousand hot spot locations on a process layer.

Accordingly, it would be advantageous to develop systems and methods for setting up CAs for inspection of a specimen that do not have one or more of the disadvantages described above.

SUMMARY OF THE INVENTION

The following description of various embodiments is not to be construed in any way as limiting the subject matter of the appended claims.

One embodiment relates to a system configured for setting up care areas (CAs) for inspection of a specimen. The system includes an imaging subsystem configured for generating images of a specimen and a computer subsystem configured for determining a number of defects detected in predefined cells within one or more of the images generated in a repeating patterned area formed on the specimen. The computer subsystem is also configured for comparing the number of the defects detected in each of two or more of the predefined cells to a predetermined threshold. In addition, the computer subsystem is configured for designating any one or more of the two or more of the predefined cells in which the number of the defects is greater than the predetermined threshold as one or more CAs. The computer subsystem is further configured for storing information for the one or more CAs for use in inspection of the specimen. The system may be further configured as described herein.

Another embodiment relates to a computer-implemented method for setting up CAs for inspection of a specimen. The method includes the determining, comparing, designating, and storing steps described above. The steps of the method are performed by a computer subsystem coupled to the imaging subsystem described above. Each of the steps of the method may be performed as described further herein. The method may include any other step(s) of any other method(s) described herein. The method may be performed by any of the systems described herein.

Another embodiment relates to a non-transitory computer-readable medium storing program instructions executable on a computer system for performing a computer-implemented method for setting up CAs for inspection of a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

"Nuisances" (which is sometimes used interchangeably with "nuisance defects") as that term is used herein is generally defined as defects that a user does not care about and/or events that are detected on a specimen but are not really actual defects on the specimen. Nuisances that are not actually defects may be detected as events due to non-defect noise sources on a specimen (e.g., grain in metal lines on the specimen, signals from underlaying layers or materials on the specimen, line edge roughness (LER), relatively small critical dimension (CD) variation in patterned attributes, thickness variations, etc.) and/or due to marginalities in the inspection system itself or its configuration used for inspection.

The term "defects of interest (DOIs)" as used herein is defined as defects that are detected on a specimen and are really actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types. In the context of the embodiments described herein, however, the term "DOIs" is used to refer to any and all real defects on a specimen.

The terms "design," "design data," and "design information" as used interchangeably herein generally refer to the physical design (layout) of an IC or other semiconductor device and data derived from the physical design through complex simulation or simple geometric and Boolean operations. The design may include any other design data or design data proxies described in commonly owned U.S. Pat. No. 7,570,796 issued on Aug. 4, 2009 to Zafar et al. and 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data. Furthermore, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured for setting up care areas (CAs) for inspection of a specimen. As described further herein, the embodiments advantageously provide advanced methods for identifying systematic noise locations for inspection CA generation. In general, the embodiments described herein exploit the fact that noise sources can be identified after inspecting a process wafer or another specimen described herein. For example, the locations of random defects are expected to be relatively spread out throughout a die or other repeating patterned area on a specimen. In contrast, the events from systematic noise hotspots will be concentrated to specific locations. The unique embodiments described herein have been developed to identify such concentrated noise locations and separate them from random defects. In this manner, the embodiments described herein provide methods and systems for advanced CA setup for dealing with systematic nuisances.

In one embodiment, the specimen is a wafer. The wafer may include any wafer known in the semiconductor arts. In another embodiment, the specimen is a reticle. The reticle may include any reticle known in the semiconductor arts. Although some embodiments may be described herein with respect to a wafer or wafers, the embodiments are not limited in the specimen for which they can be used. For example, the embodiments described herein may be used for specimens such as reticles, flat panels, personal computer (PC) boards, and other semiconductor specimens.

One embodiment of such a system includes an imaging subsystem configured for generating images of a specimen. In some embodiments, the imaging subsystem includes at least an energy source and a detector. The energy source is configured to generate energy that is directed to a specimen. The detector is configured to detect energy from the specimen and to generate output responsive to the detected energy.

Figure 1:
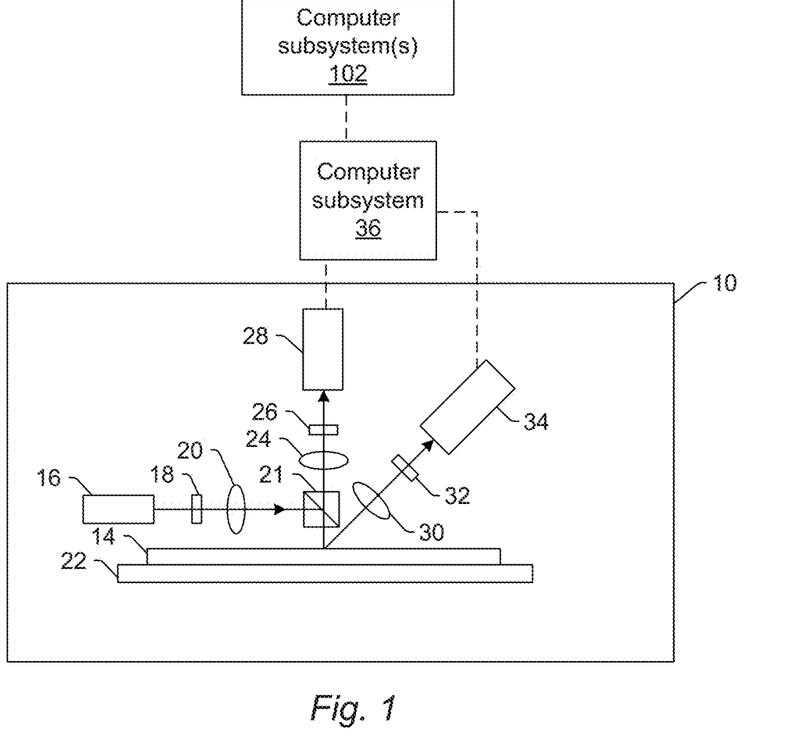
FIGS. 1 and 2 are schematic diagrams illustrating side views of embodiments of a system configured as described herein.

In one embodiment, the imaging subsystem is a light-based imaging subsystem. For example, in the embodiment of the system shown in FIG. 1, imaging subsystem 10 includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. As shown in FIG. 1, light from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen and the defects to be detected on the specimen.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different angle of incidence.

In some instances, the imaging subsystem may be configured to direct light to the specimen at more than one angle of incidence at the same time. For example, the imaging subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

In one embodiment, light source 16 includes a broadband plasma (BBP) light source. In this manner, the light generated by the light source and directed to the specimen may include broadband light. However, the light source may include any other suitable light source such as a laser, which may be any suitable laser known in the art and may be configured to generate light at any suitable wavelength(s) known in the art. The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for imaging.

The imaging subsystem may also include a scanning subsystem configured to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be scanned over the specimen. In addition, or alternatively, the imaging subsystem may be configured such that one or more optical elements of the imaging subsystem perform some scanning of the light over the specimen. The light may be scanned over the specimen in any suitable fashion.

The imaging subsystem further includes one or more detection channels. At least one of the one or more detection channels includes a detector configured to detect light from the specimen due to illumination of the specimen by the imaging subsystem and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the imaging subsystem that includes two detection channels, the imaging subsystem may include a different number of detection channels (e.g., only one detection channel or two or more detection channels). Although each of the collectors are shown in FIG. 1 as single refractive optical elements, each of the collectors may include one or more refractive optical element(s) and/or one or more reflective optical element(s).

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

It is noted that FIG. 1 is provided herein to generally illustrate a configuration of an imaging subsystem that may be included in the system embodiments described herein. Obviously, the imaging subsystem configuration described herein may be altered to optimize the performance of the system as is normally performed when designing a commercial imaging system. In addition, the systems described herein may be implemented using an existing imaging system (e.g., by adding functionality described herein to an existing inspection system) such as the 29xx and 39xx series of tools that are commercially available from KLA Corp., Milpitas, Calif. For some such systems, the embodiments described herein may be provided as optional functionality of the imaging system (e.g., in addition to other functionality of the imaging system). Alternatively, the imaging subsystem described herein may be designed "from scratch" to provide a completely new imaging system.

Computer subsystem 36 of the system may be coupled to the detectors of the imaging subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, the different computer subsystems may be coupled to each other such that images, data, information, instructions, etc. can be sent between the computer subsystems as described further herein. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based subsystem, the imaging subsystem may be an electron-based subsystem. For example, in one embodiment, the energy directed to the specimen includes electrons, and the energy detected from the specimen includes electrons. In this manner, the energy source may be an electron beam source. In one such embodiment shown in FIG. 2, the imaging subsystem includes electron column 122, which is coupled to computer subsystem 124.

Figure 2:
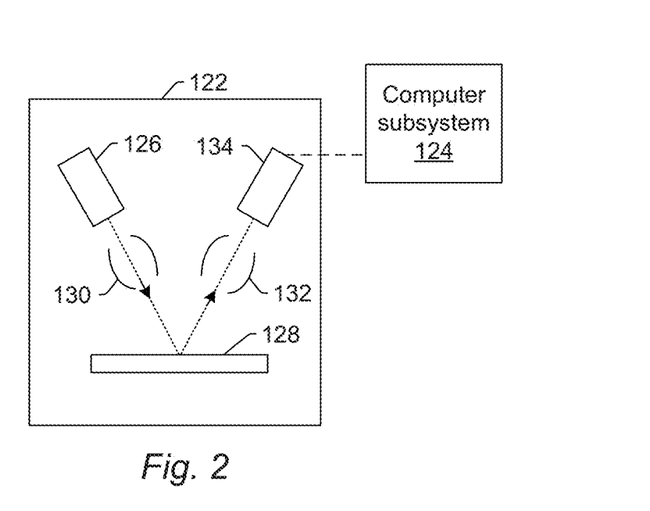

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., 8,692,204 issued Apr. 8, 2014 to Kojima et al., 8,698,093 issued Apr. 15, 2014 to Gubbens et al., and 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam subsystem may be configured to use multiple modes to generate images of the specimen (e.g., with different illumination angles, collection angles, etc.). The multiple modes of the electron beam subsystem may be different in any image generation parameter(s) of the subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform any of the functions described herein using the output of the detector and/or the electron beam images. Computer subsystem 124 may be configured to perform any additional step(s) described herein. A system that includes the imaging subsystem shown in FIG. 2 may be further configured as described herein.

It is noted that FIG. 2 is provided herein to generally illustrate a configuration of an electron-based imaging subsystem that may be included in the embodiments described herein. As with the optical subsystem described above, the electron beam subsystem configuration described herein may be altered to optimize the performance of the subsystem as is normally performed when designing a commercial imaging system. In addition, the systems described herein may be implemented using an existing imaging system (e.g., by adding functionality described herein to an existing imaging system). For some such systems, the embodiments described herein may be provided as optional functionality of the system (e.g., in addition to other functionality of the system). Alternatively, the system described herein may be designed "from scratch" to provide a completely new system.

Although the imaging subsystem is described above as being a light-based or electron beam-based subsystem, the imaging subsystem may be an ion beam-based subsystem. Such an imaging subsystem may be configured as shown in FIG. 2 except that the electron beam source may be replaced with any suitable ion beam source known in the art. In one embodiment, therefore, the energy directed to the specimen includes ions. In addition, the imaging subsystem may be any other suitable ion beam-based imaging subsystem such as those included in commercially available focused ion beam (FIB) systems, helium ion microscopy (HIM) systems, and secondary ion mass spectroscopy (SIMS) systems.

The imaging subsystems described herein may be configured to generate output, e.g., images, of the specimen with multiple modes. In general, a "mode" is defined by the values of parameters of the imaging subsystem used for generating output and/or images of a specimen (or the output used to generate images of the specimen). Therefore, modes may be different in the values for at least one of the parameters of the imaging subsystem (other than position on the specimen at which the output is generated). For example, in an optical subsystem, different modes may use different wavelength(s) of light for illumination. The modes may be different in the illumination wavelength(s) as described further herein (e.g., by using different light sources, different spectral filters, etc. for different modes). In another example, different modes may use different illumination channels of the optical subsystem. For example, as noted above, the optical subsystem may include more than one illumination channel. As such, different illumination channels may be used for different modes. The modes may also or alternatively be different in one or more collection/detection parameters of the optical subsystem. The modes may be different in any one or more alterable parameters (e.g., illumination polarization(s), angle(s), wavelength(s), etc., detection polarization(s), angle(s), wavelength(s), etc.) of the imaging subsystem. The imaging subsystem may be configured to scan the specimen with the different modes in the same scan or different scans, e.g., depending on the capability of using multiple modes to scan the specimen at the same time.

In a similar manner, the output generated by the electron beam subsystem may include output, e.g., images, generated by the electron beam subsystem with two or more different values of a parameter of the electron beam subsystem. The multiple modes of the electron beam subsystem can be defined by the values of parameters of the electron beam subsystem used for generating output and/or images for a specimen. Therefore, modes may be different in the values for at least one of the electron beam parameters of the electron beam subsystem. For example, different modes may use different angles of incidence for illumination.

As noted above, the optical, electron, and ion beam subsystems are configured for scanning energy (e.g., light, electrons, etc.) over a physical version of the specimen thereby generating output for the physical version of the specimen. In this manner, the optical, electron, and ion beam subsystems may be configured as "actual" subsystems, rather than "virtual" subsystems. However, a storage medium (not shown) and computer subsystem(s) 102 shown in FIG. 1 may be configured as a "virtual" system. In particular, the storage medium and the computer subsystem(s) may be configured as a "virtual" inspection system as described in commonly assigned U.S. Pat. No. 8,126,255 issued on Feb. 28, 2012 to Bhaskar et al. and 9,222,895 issued on Dec. 29, 2015 to Duffy et al., both of which are incorporated by reference as if fully set forth herein. The embodiments described herein may be further configured as described in these patents.

Figure 3:
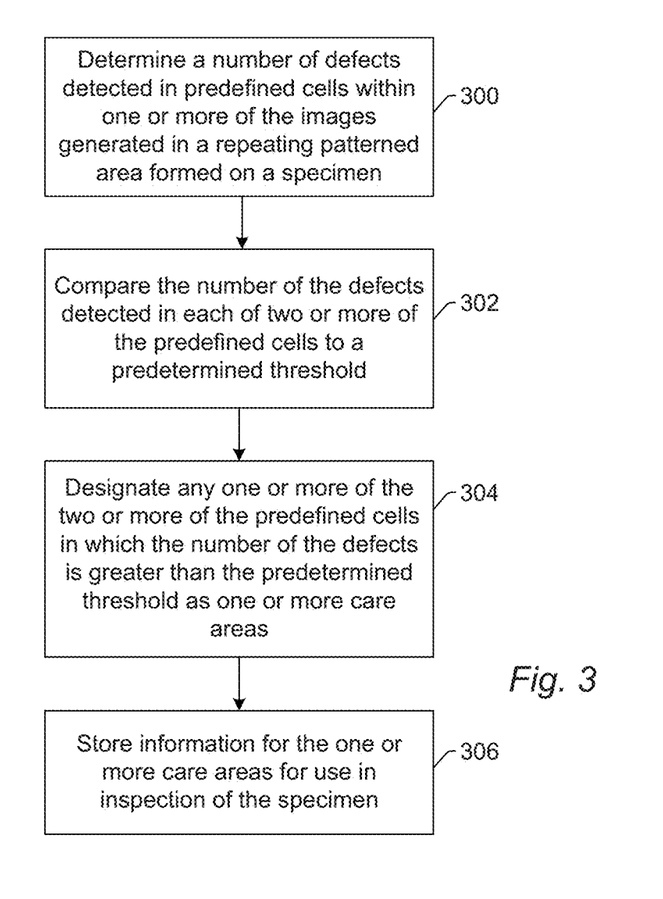
FIG. 3 is a flow chart illustrating an embodiment of steps performed by a computer subsystem described herein.

The computer subsystem is configured for determining a number of defects detected in predefined cells within one or more of the images generated in a repeating patterned area formed on the specimen, as shown in step 300 of FIG. 3. The number of defects per each predefined cell may be used as a kind of localized spatial distribution or localized defect density of the detected defects in different areas on the specimen. That is, the number of defects in each predefined cell gives an indication of how the detected defects are spread out in some areas on the specimen and/or concentrated in other areas on the specimen. As described further herein, locations of random defects are expected to be relatively spread out through a die or other repeating patterned area on the specimen. In contrast, events from systematic noise hotspots would typically be concentrated to specific locations. Therefore, by determining the number of defects detected in the predefined cells, those numbers can be used to identify such concentrated noise locations and separate them from the random defects.

Determining the number of defects detected in the predefined cells may include performing a specimen inspection on a given process layer. In this manner, the embodiments described herein may be configured for performing the defect detection using images generated by the imaging subsystem. For example, a reference image may be subtracted from an image for one repeating patterned area on the specimen to thereby generate a difference image. The reference image may be a database type reference (generated from the design for the specimen and without specimen images), an image of the specimen from a different repeating patterned area on the specimen (such as in a die-to-die inspection), an image generated from more than one image of more than one repeating patterned area (e.g., a standard reference die image), or any other suitable reference image known in the art. A threshold may then be applied to the difference image to detect defects. In particular, any signals or image portions having a value above the threshold may be designated as a defect, and all other signals or image portions having a value below the threshold may be not designated as a defect. Of course, such a defect detection is perhaps the most simple type of defect detection, and the defects described herein may be detected using any defect detection method or algorithm known in the art. In other words, the embodiments described herein are not limited in the manner in which the defects are detected.

The defects whose number is determined as described herein may be detected by the computer subsystem described herein using images generated by the imaging subsystem. However, another computer subsystem may perform the defect detection, and the computer subsystem described herein may use the detected defects to perform the steps described herein. For example, one computer subsystem may perform the defect detection, and the computer subsystem described herein may acquire the results of the defect detection from that computer subsystem or from a storage medium in which the other computer subsystem has stored the defect detection results. In one such example, one computer subsystem may export a defect detection or inspection results file such as a KLARF, which is a standard, proprietary file format some inspection tools commercially available from KLA use to export results, and such a file may be fed to or acquired by a computer subsystem described herein to perform the steps described herein. The defect detection results that are used to determine the number of defects as described herein may include any information that is generated by the defect detection such as repeating patterned area size (e.g., die size) and coordinates (e.g., die-based coordinates) of the defects.

The defects detected on the specimen whose number is determined as described herein include all detected events on the specimen. For example, the "defects" that are detected using the images may include actual defects or DOIs, nuisance, noise, etc. Therefore, the "defects" whose number is determined as described herein may more aptly be referred to as "detected events" or "defect candidates" because the "defects" used in this step are not the defects that have been confirmed as defects via nuisance filtering, defect classification, or any other post-detection process step.

In another embodiment, the computer subsystem is configured for detecting the defects in the one or more of the images using a hot threshold. For example, the imaging and computer subsystems may run a substantially hot scan for a given layer. A "hot threshold" can be generally defined as a threshold used for detecting potential defects that is set intentionally at or substantially near the noise floor of the images generated by the imaging subsystem. "Hot scans" performed using a hot threshold are typically performed to detect as many potential defects and actual defects as possible to ensure that the most defects or all of the interesting defects are captured and/or to ensure that defects having relatively weak signals are captured. For example, in the embodiments described herein, detecting defects using a hot threshold ensures that all random defects are detected and that the systematic nuisances are found so that the CAs can be accurately defined based on those results. The hot threshold may be applied to the difference images generated as described herein, any image signals or data above the hot threshold may be identified as potential defects, and signals or data that are not above the hot threshold are not identified as potential defects.

In one embodiment, the repeating patterned area formed on the specimen is a repeating die formed on the specimen. However, the repeating patterned area may be any selected, specific region on the specimen where systematic nuisance is observed or expected. For example, the predefined cells may be overlaid with or defined in an area of a die formed on the specimen, but any other repeating patterned area on a specimen such as those described herein may be used such as a field, only a particular region within a die, etc.

Figure 4:
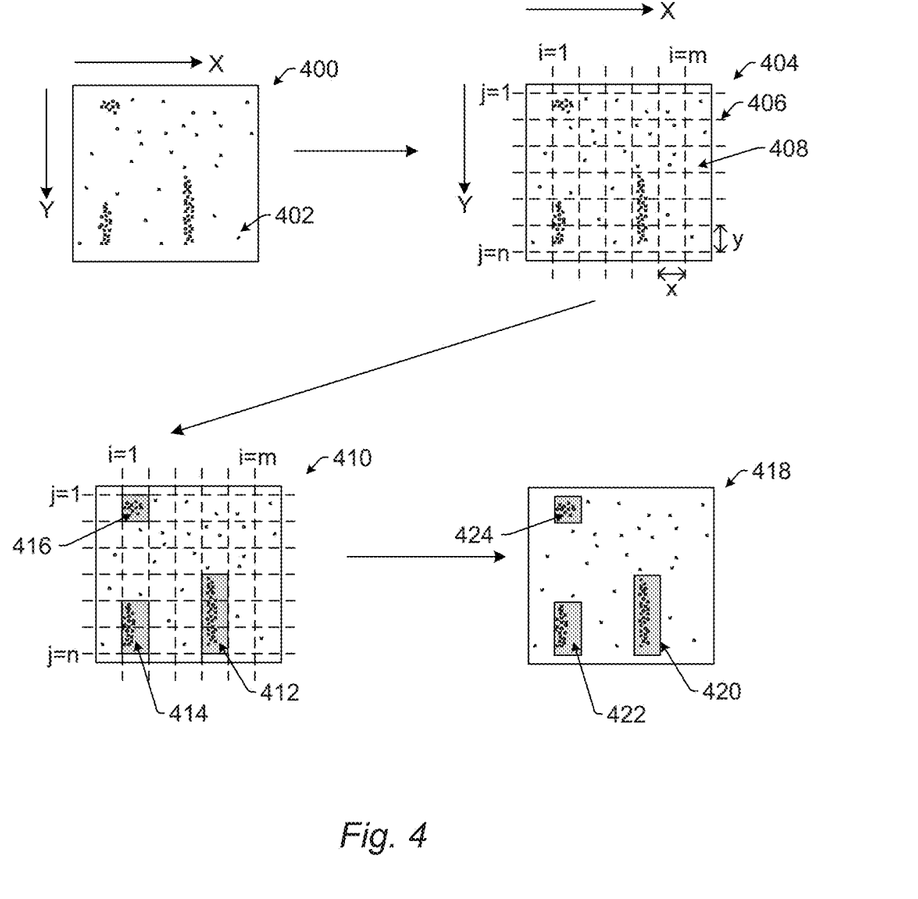
FIGS. 4 and 5 are schematic diagrams illustrating plan views of examples of defects detected in a repeating patterned area of a specimen and results of various steps described herein for setting up care areas (CAs) for inspection of the specimen based on the detected defects and predefined cells having different sizes.

In one embodiment, the predefined cells include a regular array of the predefined cells. In another embodiment, at least a majority of the predefined cells have the same shape and size. For example, the entire repeating patterned area is divided into cells of unit size: x, y, where x and y are pre-defined user inputs. For a given x, y, the entire repeating patterned area layout is divided into m×n cells. For example, as shown in FIG. 4, defect detection results 400 may include a map or plot of detected defects 402 as a function of position within a repeating patterned area. In other words, each of the dots shown in these results indicates the detection of a defect within the repeating patterned area at the location of the dot in the X and Y directions shown in FIG. 4. Results 400 may be for a single instance of a repeating patterned area (e.g., a single die) or may be for multiple instances of a repeating patterned area (e.g., a die stack), which may be generated as described further herein.

The entire repeating patterned area may then be divided into (m×n) cells as shown in results 404. For example, the repeating patterned area is divided into predefined cells 408 defined by dashed lines 406 that extend in both the X and Y directions. Each of the cells has a dimension in the X direction of x and in the Y direction of y. In this manner, at least a majority of the predefined cells have the same dimensions in both the X and Y directions and are arranged in a regular array within the repeating patterned area. In particular, as shown in FIG. 4, some of the predefined cells at the top and bottom of the repeating patterned area have smaller dimensions in the Y direction, which can also occur in the X direction (not shown in FIG. 4), when the dimensions of the repeating patterned area are not evenly divisible by the predefined cell unit width or length. Those areas that cannot be divided evenly into the predefined cell unit size may not be evaluated in the steps described herein. As shown in FIG. 4, the predefined cells may have the same size in both the X and Y directions and therefore may have a square shape, but that is not required. For example, the predefined cells may have different dimensions in the X and Y directions so that they each have a rectangular shape. In any case, each of the predefined cells preferably has the same unit size in X and Y as each other predefined cell so that the number of defects per predefined cell can be used to evaluate whether each predefined cell contains systematic noise or not.

The cells may then be referred to by their position in X and Y as cell (i, j) where as shown in FIG. 4, i is defined in X from i=1 to i=m and j is defined in Y from j=1 to j=n. Although FIG. 4 shows a certain number of cells within the repeating patterned area, the number of cells may vary from that shown and may depend on the cell unit size, which can be selected by a user or in any other suitable manner. In addition, although the predefined cell boundaries are shown overlaid with defect detection results 400 so that the areas of the predefined cells within the repeating patterned area can be easily viewed by a user, the embodiments described herein do not necessarily have to generate such a visual representation of the locations of the defects with respect to the repeating patterned area and the predefined cells. For example, if the coordinates of the predefined cells within a repeating patterned area are known (based on how the predefined cells have been setup by a user or the computer subsystem), those coordinates and the coordinates of the detected defects may be used to assign defects to different predefined cells. The assignation of defects to cells may include, for example, assigning to the defects the ID of the cell in which they are located. As shown in results 404 in FIG. 4, once the predefined cells are defined within the repeating patterned area, the number of defects detected in each of the predefined cells can be easily determined by the computer subsystem. This is true regardless of whether a visual representation of the predefined cells and detected defect locations within the repeating patterned area is generated and used to identify the predefined cells in which the defects are located.

In a further embodiment, characteristics of the predefined cells are independent of a design for the repeating patterned area. In this manner, the embodiments described herein can define CAs based on only defect locations and without using any design information for the specimen. Therefore, unlike previously used systems and methods for setting up inspection CAs, the embodiments described herein are not computationally expensive methods and do not require access to the intellectual property such as GDS files of the entity that designed the device, at least a portion of which is being inspected. In addition, the embodiments described herein can automatically identify systematic noise sources and designate areas in which those systematic noise sources are located as CAs, thereby making the embodiments described herein much faster for setting up inspection CAs compared to other currently used methods and systems.

In some embodiments, determining the number of the defects includes stacking information for the defects detected in the predefined cells within the one or more of the images corresponding to multiple instances of the repeating patterned area and determining the number of defects detected in the predefined cells from the stacked information. For example, the concentration of the events from systematic noise hotspots to specific locations will be more pronounced in a die stack view. The defect detection results shown in FIGS. 4 and 5, e.g., results 400 and 500, may be a die stack view generated by a specimen scan. Although identifying systematic nuisance locations can be done using defect data from a single die, using multiple die information (in a die stack) can strengthen the nuisance sources and result in a higher accuracy of systematic noise source identification.

Die stacking may be performed in any suitable manner known in the art. For example, the defect information for multiple instances of a die may be stacked by aligning the defect information for the multiple instances of the die to each other and then combining the defect information for the multiple instances by overlaying that defect information on top of each other. In this manner, die stacking may generate a visual representation such as that shown in FIGS. 4 and 5 for the defects detected in multiple dies. However, generating such a visual representation of overlaid defect information is not necessary and instead the defect information may be combined in another way such as a purely quantitative manner, e.g., generating a single value of the total defect count per unit cell stack.

The computer subsystem is also configured for comparing the number of the defects detected in each of two or more of the predefined cells to a predetermined threshold, as shown in step 302 of FIG. 3. A user may input the threshold value for number of defects per unit cell (T). The user may select any suitable value for T such as greater than 5 defects in a unit cell qualifies that unit cell as containing systematic nuisance. The predetermined threshold may however be defined by the embodiments described herein in a number of manners. For example, the number of defects detected in each predefined cell may be determined and then outlier cells (i.e., predefined cells containing a number of defects that is an outlier compared to the numbers of defects detected in other predefined cells) may be identified and used to determine an appropriate threshold (e.g., setting T to less than the numbers of defects per unit cell in the outlier cells). We define $N_{i,j}$ as the number of defects located in any given cell (i, j).

In one embodiment, the predetermined threshold is selected to be lower than numbers of defects detected when systematic noise is present. In another embodiment, the predetermined threshold is selected to be higher than numbers of defects detected when systematic noise is absent. For example, random defects tend to have lesser bias towards any specific locations in a repeating patterned area. Each cell, as a result, will have a lower number of defect count if only random defects are present and have been detected. On the contrary, defects from systematic noise sources tend to cluster around specific process or design features on the repeating patterned area. Therefore, when a systematic noise source is present in a cell that cell would have a higher defect count. In this manner, the embodiments described herein provide a novel method that aims to identify the systematic noise hotspots based on defect locations from a wafer map. Once the systematic nuisances are segregated from other detected defects based on their locations, the computer subsystem can create CAs on target locations for optimum sensitivity as described further herein.

The embodiments described herein, therefore, aim to distinguish cells based on $N_{i,j}$ (number of defects in a given cell) relative to T. The output from this operation is the location coordinates of the cells that satisfy the following condition (C):

$$C: \left[\frac{N_{i,j}}{T}\right]_{i,j=1}^{i=m, j=n} > 1 \text{(true for systematic noise locations)}$$

$$\left[\frac{N_{i,j}}{T}\right]_{i,j=1}^{i=m, j=n} \leq 1 \text{(false for systematic noise locations)}$$

Therefore, the computer subsystem may flag the cells satisfying the condition C and can use this information for CA generation. For example, the computer subsystem may record the cell location coordinates for any cell that meets the true for systematic noise locations condition and may ignore any cells that are false for the systematic noise locations condition. The value of T can be chosen by a user as appropriate for an inspection platform. The output from this operation can be used to generate customized CAs as described further herein.

In the example shown in FIG. 4, results 410 visually show the results of comparing the number of the defects detected in the predefined cells to a threshold. In particular, once the repeating patterned area layout is divided into cells as shown in results 404, the condition C may be applied to each of the cells. Groups 412, 414, and 416 of predefined cells shown in results 410 as the shaded predefined cells meet condition C because the number of defects detected in these predefined cells is greater than the predetermined threshold. The remaining predefined cells shown in FIG. 4 do not meet condition C and therefore are not flagged as true for the systematic noise locations condition. In this manner, the computer subsystem may flag the cells that are shaded because they meet the criteria and may record the cell coordinates of the flagged cells.

Although the embodiments are described herein as designating predefined cell(s) as CA(s) based on a number of defects per predefined cell where that number is the actual defect count per unit cell, the number of defects may be something other than the absolute number of defects per unit cell. For example, although using the absolute defect count per unit cell is the most simple and straightforward way to identify areas containing systematic nuisance, other ways of quantifying the number of defects per unit cell may be used such as an average or total number of defects in a unit cell in multiple instances of the repeating patterned area, a density of the defects detected in a unit cell in one or more instances of the repeating patterned area, a spatial distribution of the defects detected in a unit cell in one or more instances of the repeating patterned area, etc. In other words, one of the advantages of the embodiments described herein is their unexpected simplicity in effectively using defect count per unit cell in a repeating patterned area to identify systematic nuisance locations on a specimen. However, the embodiments described herein are not limited to just using defect count per unit cell for CA identification and more involved or complicated ways to quantify the defects per unit cell may be used. Whether the defect count or some other measure is used to quantify the defects per unit cell for CA identification may be determined in any suitable manner and may vary depending on the expected characteristics of the systematic nuisances.

In a further embodiment, the inspection of the specimen is performed to detect random defects on the specimen. For example, the embodiments described herein are particularly useful for providing better separation between random defects and systematic nuisances. Once the systematic nuisance locations are identified, this information can be used to generate targeted CAs. The user can then choose to assign new CAs for any of the predefined cells designated as described herein as "do not care areas" or inspect them with different sensitivity. In other words, the CAs that are identified as described herein are areas that are not to be inspected at all or will be inspected with a lower sensitivity so that the systematic nuisances that are present in these CAs are not detected. Separating the systematic nuisance locations from other locations on the specimen will enable the user to have higher sensitivity on the rest of the specimen for random defect detection.

As described above, therefore, in one embodiment, the one or more CAs are one or more areas in the repeating patterned area on the specimen in which the inspection is not to be performed. In another embodiment, the one or more CAs are one or more areas in the repeating patterned area on the specimen in which the inspection is to be performed with less sensitivity than other areas in the repeating patterned area on the specimen. One advantage of the embodiments described herein is that they can improve inspection sensitivity by identifying systematic noise hotspot locations for CA generation. The CAs identified as described herein can then be inspected with lower sensitivity than other areas or not inspected at all for defects.

The computer subsystem is further configured for designating any one or more of the two or more of the predefined cells in which the number of the defects is greater than the predetermined threshold as one or more CAs, as shown in step 304 of FIG. 3. For example, the computer subsystem may generate CAs based on the flagged cell coordinates in results 410 shown in FIG. 4. In other words, the computer subsystem may generate CA information 418, which may include CAs 420, 422, and 424 having the same characteristics within the repeating patterned area as groups 412, 414, and 416, respectively, of flagged predefined cells that meet condition C. Designating one or more of the predefined cells as CAs based on condition C may be performed in any suitable manner known in the art using any suitable indicia known in the art.

As shown in FIG. 4, any flagged cells that are adjacent to each other may be combined into a single CA. This is not however required and flagged cells that are adjacent to each other may each be designated as a different CA. In addition, although each of the CAs shown in FIG. 4 have a square or rectangular shape, such regular shapes are not limiting. For example, depending on which cells are flagged, the CAs generated from multiple, flagged cells may have an L shape, a U shape, an O shape, etc. Therefore, the CAs generated as described herein may have an irregular polygonal shape. In addition, although a particular number of CAs are shown in FIG. 4, the number of cells that are designated as CAs is not limited in the embodiments described herein. In some instances, the user may provide an upper limit on the number of CAs that are designated in the embodiments described herein so that an acceptable area on the specimen is inspected in the process. When the number of cells that are flagged as CAs exceeds an upper limit, this may also be used as an indication that the parameters of the imaging subsystem or computer subsystem used to detect the defects may need to be adjusted (because too many systematic nuisances are being detected) or that a different specimen may need to be inspected (because there may be an issue with the inspected specimen that is causing too many systematic nuisances to be detected).

Figure 5:
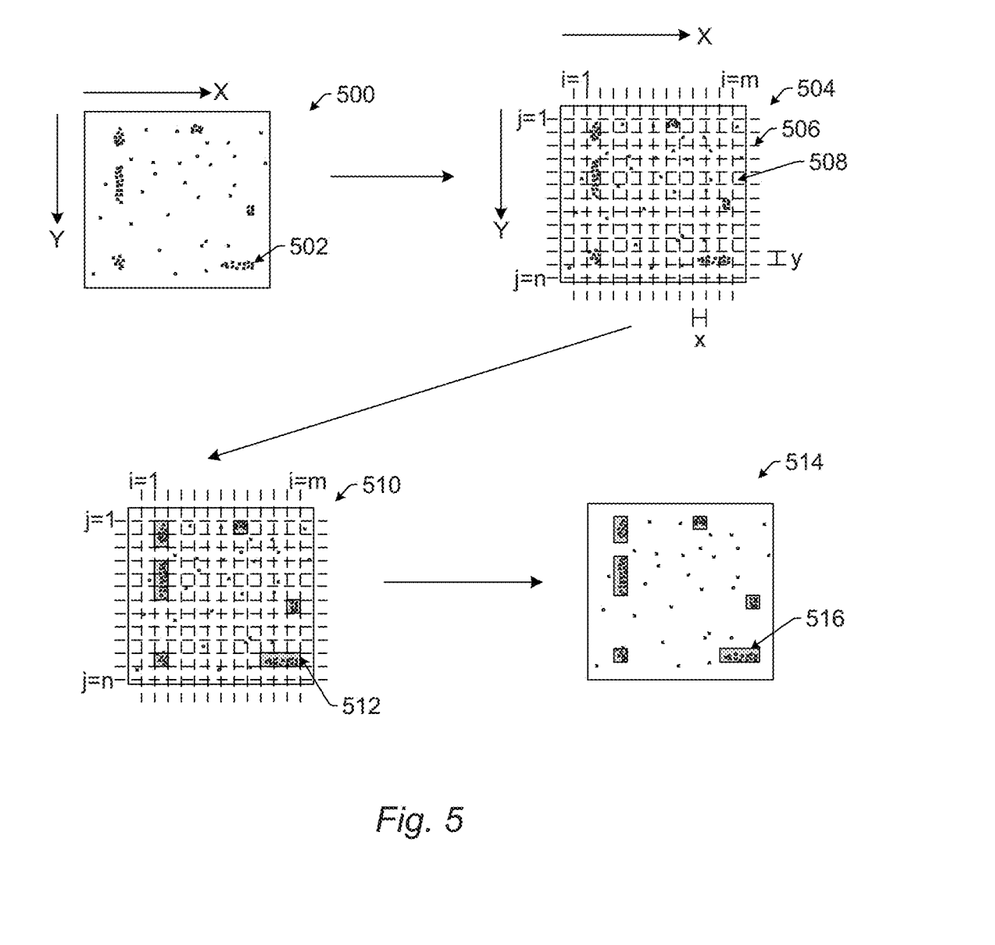

In one embodiment, the predefined cells have a first size, and the computer subsystem is configured for performing the determining, comparing, and designating steps for other predefined cells having a second size different than the first size. For example, dividing the entire repeating patterned area into cells of unit size can be reiterated with different (x, y) values as appropriate for an inspection platform. FIG. 5 shows one example of performing the steps described herein but with a smaller predefined cell size than used in FIG. 4. For example, defect detection results 500 show the locations of defects 502 detected within a repeating patterned area on a specimen. The defect detection results may include any of those described herein generated in any manner described herein. Results 504 may be generated by overlaying dashed lines 506 on defect detection results 500, which define the area of predefined cells 508 within the repeating patterned area. The predefined cells may be further configured as described herein except that they have different dimensions in x and y from those used in FIG. 4. As shown in results 510, cells that include a number of defects greater than a threshold may be flagged, and those cells are indicated in results as shaded groups 512 of cells. The information for the flagged cells may be used to generate results 514 that show CAs 516 located within the repeating patterned area. As shown by comparison of results 510 and 514, the CAs have the same characteristics as the flagged predefined cells. Performing the determining, comparing, and designating steps with a smaller size may be further configured as described herein.

In another embodiment, the imaging subsystem is configured for generating the images of the specimen with multiple modes, and the computer subsystem is configured for performing the determining, comparing, and designating steps independently for each of two or more of the multiple modes. In one such embodiment, the one or more CAs for a first of the two or more of the multiple modes are different from the one or more CAs for a second of the two or more of the multiple modes. In this manner, different CAs may be used for different modes. For example, the systematic nuisance locations will mostly depend on the architecture of the inspection platform. The embodiments described herein work on defect locations only, therefore, they can be applied to any inspection platform irrespective of its architecture and optics. Different inspection (e.g., optical or e beam) tools will perceive the presence of systematic nuisances differently based on their architectures. The embodiments described herein can work across platforms to identify and separate such locations. In addition, different optical or imaging configurations may have different nuisance sources and therefore CAs specific to those optical or imaging configurations may also be setup by the embodiments described herein and used in an inspection that uses multiple modes. In this manner, the embodiments described herein may be configured for performing the steps described herein multiple times for multiple modes to thereby generate different CAs for different imaging modes or settings.

The embodiments also find their application across all nodes and process layers. For example, since the embodiments described herein can identify CAs based solely on defects detected per unit cell, the embodiments can be used to setup CAs for any or all layers on a specimen. The embodiments also find application across time and/or process changes. For example, the embodiments described herein may be reperformed at designated intervals to check if the systematic nuisance locations have changed (e.g., due to drift in the process). The embodiments described herein can also be reperformed if the process has been intentionally changed since that may cause a change in the systematic nuisance locations.

The computer subsystem is also configured for storing information for the one or more CAs for use in inspection of the specimen, as shown in step 306 of FIG. 3. For example, the computer subsystem may generate a CA file, which may have any suitable file format or extension such as a .bin file. The information for the one or more CAs may include any suitable information such as CA location and size. During the inspection, the tool that is performing the inspection, which may or may not include the imaging subsystem and computer subsystem described herein, may auto-create CAs with the locations and dimensions specified by the stored information. In some such instances, the inspection tool may import the stored information or a representation of it into a CA UI in a Main UI of the inspection tool so that a user of the tool can gain an understanding of the information.

The computer subsystem may also be configured to store the CA information in a recipe or by generating a recipe for the inspection in which the CAs will be used. A "recipe" as that term is used herein is defined as a set of instructions that can be used by a tool to perform a process on a specimen. In this manner, generating a recipe may include generating information for how a process is to be performed, which can then be used to generate the instructions for performing that process. The information for the CAs that is stored by the computer subsystem may include any information that can be used to identify, access, and/or use the selected CAs (e.g., such as a file name and where it is stored). The information for the CAs that is stored may also include the actual code, instructions, algorithms, etc. for applying the CAs and detecting defects based on the applied CAs.

The computer subsystem may be configured for storing the information for the CAs in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc. For example, the embodiments described herein may generate an inspection recipe as described above. That inspection recipe may then be stored and used by the system or method (or another system or method) to inspect the specimen or other specimens to thereby generate information (e.g., defect information) for the specimen or other specimens.

Results and information generated by performing the inspection on the specimen or other specimens of the same type may be used in a variety of manners by the embodiments described herein and/or other systems and methods. Such functions include, but are not limited to, altering a process such as a fabrication process or step that was or will be performed on the inspected specimen or another specimen in a feedback or feedforward manner. For example, the computer subsystem described herein may be configured to determine one or more changes to a process that was performed on a specimen inspected as described herein and/or a process that will be performed on the specimen based on the detected defect(s). The changes to the process may include any suitable changes to one or more parameters of the process. The computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem described herein may determine such changes in any suitable manner known in the art.

Those changes can then be sent to a semiconductor fabrication system (not shown) or a storage medium (not shown) accessible to the computer subsystem described herein and the semiconductor fabrication system. The semiconductor fabrication system may or may not be part of the system embodiments described herein. For example, the system described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

As described herein, therefore, the embodiments can be used to setup a new inspection process or recipe. The embodiments may also be used to modify an existing inspection process or recipe, whether that is an inspection process or recipe that was used for the specimen or was created for one specimen and is being adapted for another specimen. In addition, the embodiments described herein are not just limited to CA creation or modification. For example, the embodiments described herein can also be used to select one or more other parameters for the inspection such as mode selection performed based on the systematic noise sources identified by the embodiments described herein, output processing parameter selection such as a defect detection sensitivity to be used in the systematic nuisance source areas versus the other areas, and any other parameters of the inspection process for which the CAs were setup as described herein.

The embodiments described herein provide a number of advantages over previously used methods and systems for setting up CAs for inspection processes. For example, the embodiments described herein can be used to help suppress systematic noise irrespective of inspection platform and the process layer under study. In addition, the embodiments described herein can set up CAs using only the defect coordinates and do not need access to design files or any other form of restricted intellectual property. As such, inspection platforms can use the embodiments described herein to suppress systematic nuisance without having access to restricted or sensitive intellectual property. The embodiments described herein can also be applied to both advanced technology and legacy node layers alike. Furthermore, using the CAs generated with the embodiments described herein, inspection platforms can reduce nuisance rate and therefore increase chances of finding real defects and reduce defect review loading for users.

Each of the embodiments of each of the systems described above may be combined together into one single embodiment.

Another embodiment relates to a computer-implemented method for setting up CAs for inspection of a specimen. The method includes the determining a number of defects, comparing the number of the defects, designating any one or more of the two or more of the predefined cells as CA(s), and storing information steps described above.

Each of the steps of the method may be performed as described further herein. The method may also include any other step(s) that can be performed by the imaging subsystem, computer subsystem, and/or system described herein. The steps of the method are performed by a computer subsystem coupled to an imaging subsystem, both of which may be configured according to any of the embodiments described herein. In addition, the method described above may be performed by any of the system embodiments described herein.

Figure 6:
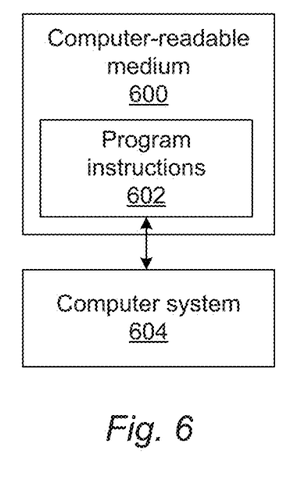
FIG. 6 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for setting up CAs for inspection of a specimen. One such embodiment is shown in FIG. 6. In particular, as shown in FIG. 6, non-transitory computer-readable medium 600 includes program instructions 602 executable on computer system 604. The computer-implemented method may include any step(s) of any method(s) described herein.

Program instructions 602 implementing methods such as those described herein may be stored on computer-readable medium 600. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 604 may be configured according to any of the embodiments described herein.

Further modifications and alternative embodiments of various aspects of the invention will be apparent to those skilled in the art in view of this description. For example, methods and systems for setting up CAs for inspection of a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to set up care areas for inspection of a specimen, comprising:
    an imaging subsystem configured for generating images of a specimen; and
    a computer subsystem configured for:
        determining a number of defects detected in predefined cells within one or more of the images generated in a repeating patterned area formed on the specimen;
        comparing the number of the defects detected in each of two or more of the predefined cells to a predetermined threshold, wherein the predetermined threshold is selected to be lower than numbers of defects detected when systematic noise is present;
        designating any one or more of the two or more of the predefined cells in which the number of the defects is greater than the predetermined threshold as one or more care areas; and
        storing information for the one or more care areas for use in inspection of the specimen.

2. The system of claim 1, wherein the predetermined threshold is further selected to be higher than numbers of defects detected when the systematic noise is absent.

3. The system of claim 1, wherein the inspection of the specimen is performed to detect random defects on the specimen.

4. The system of claim 1, wherein the one or more care areas are one or more areas in the repeating patterned area on the specimen in which the inspection is not to be performed.

5. The system of claim 1, wherein the one or more care areas are one or more areas in the repeating patterned area on the specimen in which the inspection is to be performed with less sensitivity than other areas in the repeating patterned area on the specimen.

6. The system of claim 1, wherein the predefined cells comprise a regular array of the predefined cells.

7. The system of claim 1, wherein at least a majority of the predefined cells have the same shape and size.

8. The system of claim 1, wherein characteristics of the predefined cells are independent of a design for the repeating patterned area.

9. The system of claim 1, wherein determining the number of the defects comprises stacking information for the defects detected in the predefined cells within the one or more of the images corresponding to multiple instances of the repeating patterned area and determining the number of defects detected in the predefined cells from the stacked information.

10. The system of claim 1, wherein the predefined cells have a first size, and wherein the computer subsystem is further configured for performing the determining, comparing, and designating steps for other predefined cells having a second size different than the first size.

11. The system of claim 1, wherein the computer subsystem is further configured for detecting the defects in the one or more of the images using a hot threshold.

12. The system of claim 1, wherein the imaging subsystem is further configured for generating the images of the specimen with multiple modes, and wherein the computer subsystem is further configured for performing the determining, comparing, and designating steps independently for each of two or more of the multiple modes.

13. The system of claim 12, wherein the one or more care areas for a first of the two or more of the multiple modes are different from the one or more care areas for a second of the two or more of the multiple modes.

14. The system of claim 1, wherein the repeating patterned area formed on the specimen is a repeating die formed on the specimen.

15. The system of claim 1, wherein the specimen is a wafer.

16. The system of claim 1, wherein the imaging subsystem is a light-based imaging subsystem.

17. The system of claim 1, wherein the imaging subsystem is an electron-based imaging subsystem.

18. A non-transitory computer-readable medium, storing program instructions executable on a computer system for performing a computer-implemented method for setting up care areas for inspection of a specimen, wherein the computer-implemented method comprises:

determining a number of defects detected in predefined cells within one or more images of a specimen generated by an imaging subsystem in a repeating patterned area formed on the specimen;

comparing the number of the defects detected in each of two or more of the predefined cells to a predetermined threshold, wherein the predetermined threshold is selected to be lower than numbers of defects detected when systematic noise is present;

designating any one or more of the two or more of the predefined cells in which the number of the defects is greater than the predetermined threshold as one or more care areas; and storing information for the one or more care areas for use in inspection of the specimen.

19. A computer-implemented method for setting up care areas for inspection of a specimen, comprising:

determining a number of defects detected in predefined cells within one or more images of a specimen generated by an imaging subsystem in a repeating patterned area formed on the specimen;

comparing the number of the defects detected in each of two or more of the predefined cells to a predetermined threshold, wherein the predetermined threshold is selected to be lower than numbers of defects detected when systematic noise is present;

designating any one or more of the two or more of the predefined cells in which the number of the defects is greater than the predetermined threshold as one or more care areas; and storing information for the one or more care areas for use in inspection of the specimen, wherein the determining, comparing, designating, and storing steps are performed by a computer subsystem coupled to the imaging subsystem.

* * * * *